United States Patent [19]

Curl

[11] Patent Number: 5,358,095
[45] Date of Patent: Oct. 25, 1994

[54] REMOVABLE CONVEYER FLIGHT

[76] Inventor: Robert B. Curl, 1935 San LaRue, Twin Falls, Id. 83301

[21] Appl. No.: 110,391

[22] Filed: Aug. 23, 1993

[51] Int. Cl.⁵ .............................................. B65G 15/44
[52] U.S. Cl. ................................ 198/698; 198/848; 209/665; 171/131
[58] Field of Search ............ 198/698, 731, 848; 209/665; 171/126, 130, 131

[56] References Cited

U.S. PATENT DOCUMENTS

| | | | |
|---|---|---|---|
| 1,560,716 | 11/1925 | Newdick | 198/731 |
| 1,865,879 | 7/1932 | Newhouse | 198/698 |
| 2,276,978 | 3/1942 | Hyman et al. | 198/698 |
| 2,508,847 | 5/1950 | Welling | 198/731 |
| 2,546,262 | 3/1951 | Hatcher | 198/731 |
| 2,580,786 | 1/1952 | Jewett et al. | 198/731 |
| 2,796,972 | 6/1957 | Jeffras, Sr. | 198/176 |
| 3,253,699 | 5/1966 | Schneider | 198/848 |
| 3,269,523 | 8/1966 | Creswell | 198/731 |
| 3,315,788 | 4/1967 | Anderson | 198/848 |
| 4,712,668 | 12/1987 | Gray | 198/698 |

*Primary Examiner*—Joseph E. Valenza
*Attorney, Agent, or Firm*—Frank J. Dykas; Craig M. Korfanta

[57] ABSTRACT

A removable conveyor flight formed of a flight body 12 having downwardly extending arcuate clamp arms. A pair of opposing arcuately shaped rigid clamps (14) and (16) are embedded within the flight body. Formed integrally with clamps (14) and (16) are compression tabs (20) which extend upward into the flight body to a fulcrum point (22). Bolts (28) are provided to draw the clamps together, thereby clamping the resilient clamp arms of flight body (12) against the cross bar or rod (34) of draper chain (32).

3 Claims, 4 Drawing Sheets

REMOVABLE CONVEYER FLIGHT

BACKGROUND OF THE INVENTION

Technical Field

This invention generally relates to a new flight for draper chain conveyors, and more particularly to a conveyor flight which is clampable to the transverse rod of a draper chain link.

Background

Draper chain is used in a wide variety of applications ranging from simple conveyance of all types of products to the field harvesting and elevating of food products. It is commonly used in situations where there is a need to separate a product from its environment, be it dirt and dust in the field, to water in a food processing application. The typical draper chain is formed of individual metal links having a connecting cross bar or rod of the appropriate length. Examples of draper chain links can be seen in FIG. 3 of the drawings.

Oftentimes when draper chain is used to elevate the item being conveyed, conveyor flights are added to keep the items from rolling or falling back down along the chain. These flights are usually paddle shaped and extend up normal to the plane of the elevating conveyor draper chain. In the prior art, these are typically special links wherein the conveyor flight body is substituted for the cross bar, or is formed integral with the cross bar. As a result, if the conveyor flight body breaks or wears out, the chain must be disassembled to replace the entire conveyor flight link. This is time consuming and labor intensive.

What is needed is a removable flight which can be securely clamped to an existing draper chain crossbar or rod, and which can be easily removed for repair or replacement.

DISCLOSURE OF INVENTION

These objects are achieved by use of a flight body formed of a resilient material, such as rubber, which has formed integral with it two opposing arcuately shaped clamp arms along the bottom edge which are a design for wrapping around a draper chain rod which is then frictionally engaged and held in interfitting relationship to the clamp arms.

Formed integral with and embedded within the clamp arms of the flight body are a pair of opposing rigid clamps, made of metal or plastic. These clamps have arcuately shaped clamp members which are embedded within and in conformance with the shape of the clamp arms of the flight body. Each clamp also has two upwardly extending compression tabs which are positioned to be in contact with each other at their upper ends to form a fulcrum point for closing the two clamp arms together around a draper chain rod.

The clamp arms are drawn together by means of threaded screws which pass through a hole in the compression tab of the first rigid clamp, and are threaded into a threaded bolt hole in the compression tab of the second clamp. As the bolt is tightened, the bolt head is in compression against the flight body, and the second rigid clamp is drawn toward it.

The rigid clamps are embedded within the resilient material of the flight body, so as to provide that the interior surface of the clamp arms are formed of the resilient material, usually rubber, to enhance the frictional engagement capacity of the flight to the draper chain cross bar or rod.

BEST MODE FOR CARRYING OUT INVENTION

Figure 1:
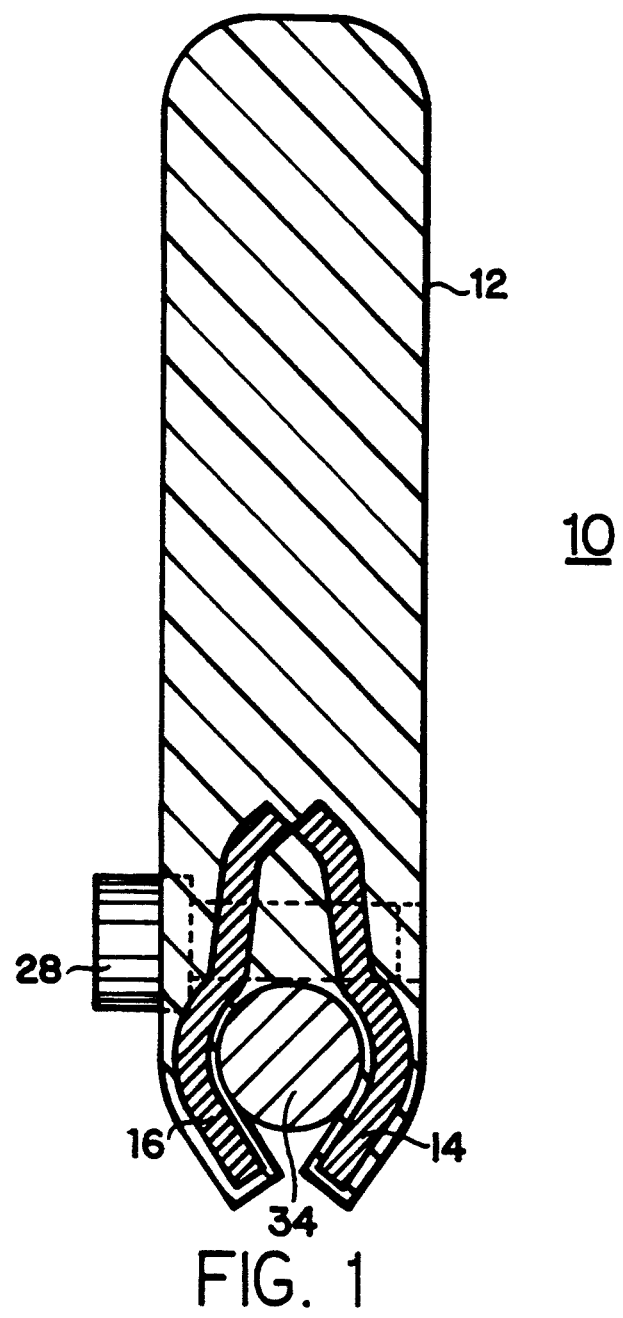
FIG. 1 is a representational cross sectional view of the removable conveyor flight showing the embedded rigid clamps.
Figure 3:
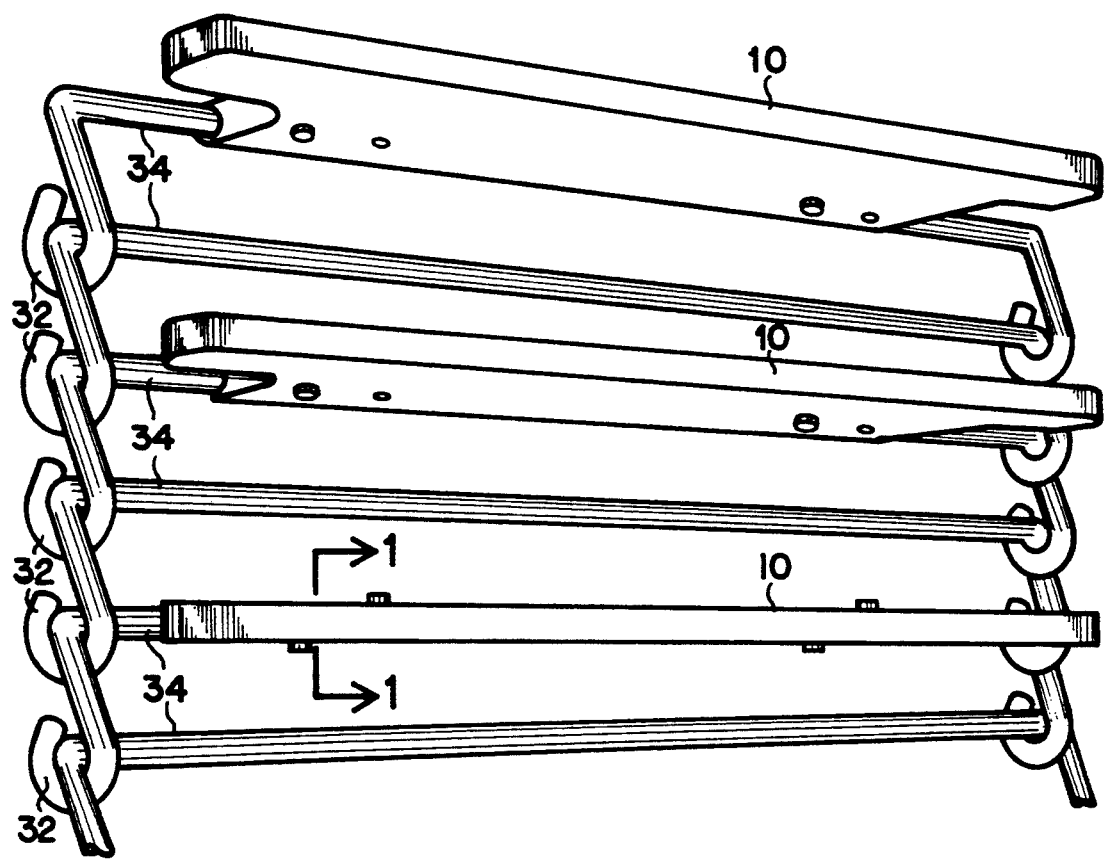
FIG. 3 is a prospective representational view of a section of draper chain links showing installation of the removable conveyor flight.

Referring to FIGS. 1 and 3, there is shown a set of draper chain links 32 having cross bar or rod 34 of a predetermined width. Attached to some of the links 32 are a set of removable conveyor flights 10. In FIG. 1, which is a cross sectional view of conveyor flight 10, it shows how conveyor flight 10 is attached to draper chain link rod 34. As can be seen, rigid clamps 14 and 16 are embedded within flight body 12 and are used to clamp the downwardly extending clamp arms of removable conveyor flight 10 around rod 34 by means of screw 28.

Figure 2:
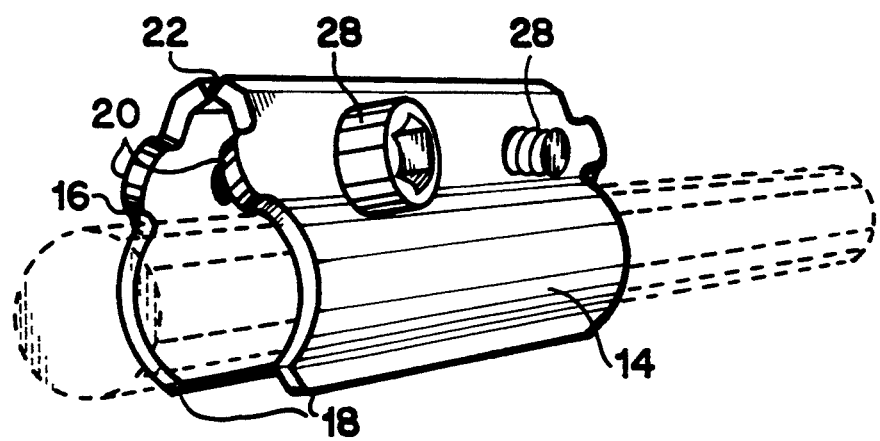
FIG. 2 is a prospective representational view of the rigid clamps.

As seen in FIGS. 1 and 2, the rigid clamps are of a specifically designed shape, having arcuate clamp members 18 and compression tabs 20. Compression tabs 20 are formed so as to remain in contact with each other, even though embedded within flight body 12. The purpose is to form a fulcrum point 22 which enables the installer to draw opposing clamps 14 and 16 together, using fulcrum point 22 as the point at which the drawing force of screws 28 compress against to draw the clamp members 18 toward each other, so that conveyor flight 10 remains firmly in compressed frictional engagement with rod 34.

Embedding clamps 14 and 16 into flight body 12 enables the resilient, usually rubber, surfaces of the clamp arms of flight body 12 to come into direct contact with rod 34, thereby enhancing the frictional characteristics and allowing conveyor flight 10 to be firmly attached to the extent that it will not rotate backwards during operation.

The fact that rigid clamps 14 and 16 are not formed of a single rigid piece, but rather are two separate pieces in contact with each other, allows a certain resiliency to the conveyor flight 10 when screws 28 are loosened, such that the two clamped arms can be easily pried apart and slipped over rod 34 for ease of installation.

Figure 4:
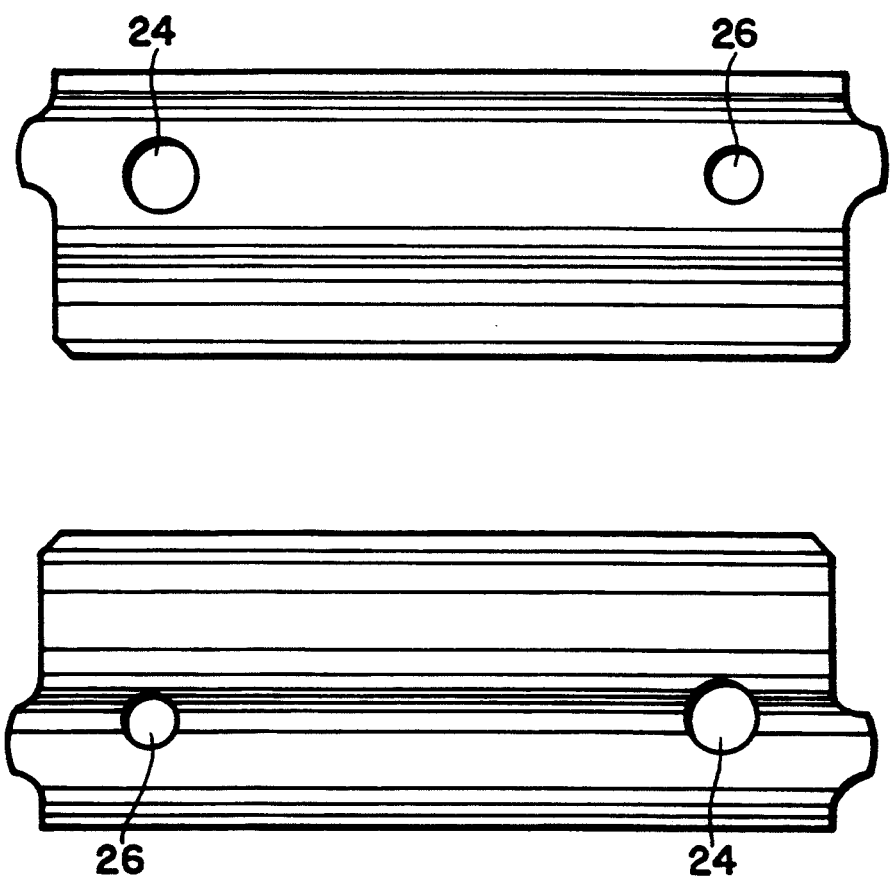
FIG. 4 is a top plan view of a pair of opposing rigid clamps.

As shown in FIGS. 3 and 4, the rigid clamps 14 and 16 are drawn together by means of bolts 28, which pass through a hole 24 in one clamp and are threaded into a threaded bolt hole 26 in the opposing clamp. As can be seen from FIG. 4, by alternating through bolt holes and threaded bolt holes, a single mold or dye can be used to form identical clamps, which when placed in opposing relationship one to the other, result in alternating directions for insertion of bolts 28.

In practice, it has been found for most commercial uses, the flight body 12 of conveyor flight 10 is formed of rubber or a composition containing rubber. Clamps 14 and 16 are formed of stamped metal, however, it should be apparent to those skilled in the art that a variety of different materials could be used for both the body and the clamps and a variety of suitable materials could be substituted for use in forming the body and the clamps. The only requirement is that the clamps should be embedded within the body.

While there is shown and described the present preferred embodiment of the invention, it is to be distinctly understood that this invention is not limited thereto but may be variously embodied to practice within the scope of the following claims.

I claim:

1. A removable conveyor flight for use with the rod of a draper chain link which comprises:

a flight body formed of resilient material and configured to have an upper edge extending up normally from, and in axial alignment with, the rod of a draper chain link, and a pair of opposing arcuately shaped clamp arms for circumferential engagement with the rod of said draper chain link, formed integral with and extending down from and along the bottom edge of said flight body for receiving and removably holding the draper chain rod in interfitting relationship;

a pair of opposing rigid clamps embedded within said resilient flight body, each having an arcuately shaped clamp member embedded within and in arcuate alignment with one of the arcuately shaped clamp arms, said opposing clamps each further having a compression tab attached to said arcuate clamp, with each of said compression tabs extending generally upwardly from said clamp, and with the upper ends of said tabs in contact with each other to form a fulcrum point; and means for selectively drawing the compression tabs toward each other to hold the clamp arms in compressive frictional engagement with the rod of the draper chain link.

2. The removable conveyor flight of claim No. 1 wherein the means for selectively drawing the compression tabs toward each other further comprises:

the compression tabs and the flight body each having a plurality of bolt holes, forming sets of holes in axial alignment with each other to form through bolt holes; and a plurality of bolts inserted through said through bolt holes for drawing the compression tabs toward each other so as to hold the clamp arms of the flight body in compressive frictional engagement with the draper chain link rod.

3. The removable conveyor flight of claim No. 1 wherein the means for selectively drawing the compression tabs toward each other further comprises:

the compression tabs each having a plurality of bolts holes and threaded bolt holes forming a plurality of sets of a bolt hole and a threaded bolt hole in axial alignment with each other;

the flight body having a plurality of bolt holes, each in axial alignment with the sets of holes in the compression tabs; and a plurality of bolts inserted through said bolt holes and in threaded engagement with a threaded bolt hole of each set of holes for drawing the compression tabs toward each other so as to hold the clamp arms of the flight body in compressive frictional engagement with the draper chain link rod.

* * * * *